United States Patent
Leonardo et al.

[11] Patent Number: 5,997,272
[45] Date of Patent: *Dec. 7, 1999

[54] EXTRUDER DIE INSERT PLATE SYSTEM

[75] Inventors: Joseph L. Leonardo, Penfield; J. Stephen Kittelberger, Rochester; John J. Ianni, Medina, all of N.Y.; Fraser S. Smith, Burlington; Fumii Higuchi, Mississauga, both of Canada

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/624,780

[22] Filed: Mar. 27, 1996

[51] Int. Cl.⁶ .................................................. B29C 47/08
[52] U.S. Cl. ................ 425/190; 425/192 R; 425/380; 425/467
[58] Field of Search .................... 425/461, 382.4, 425/465–467, 190, 192 R, 380; 264/176.1, 177.6

[56] References Cited

U.S. PATENT DOCUMENTS

| | | | |
|---|---|---|---|
| 3,778,287 | 12/1973 | Stansfield et al. . | |
| 3,806,289 | 4/1974 | Schwarz | 425/72 |
| 4,201,534 | 5/1980 | Phipps | 425/461 |
| 4,464,104 | 8/1984 | Gneuss | 425/192 R |
| 4,894,308 | 1/1990 | Mahabadi et al. . | |
| 4,963,309 | 10/1990 | Gohlisch et al. | 264/175 |
| 4,973,439 | 11/1990 | Ghang et al. . | |
| 5,145,762 | 9/1992 | Grushkin . | |
| 5,176,925 | 1/1993 | Weber et al. | 425/191 |
| 5,221,541 | 6/1993 | Arbour et al. | 425/188 |
| 5,227,460 | 7/1993 | Mahabadi et al. . | |
| 5,376,494 | 12/1994 | Mahabadi et al. . | |
| 5,700,413 | 12/1997 | Higuchi et al. | 425/461 |

Primary Examiner—Harold Pyon
Assistant Examiner—Joseph Leyson
Attorney, Agent, or Firm—John S. Wagley

[57] ABSTRACT

A die for the preparation of a toner resin in an extruder having a housing defining a housing aperture therein and a conveyor for conveying the resin through the housing aperture to form a stream of resin is provided. The die includes a member connected to a first end of the housing. The member defines an opening therethrough. The cross sectional area of the opening is progressively reduced in the direction of the stream of resin for at least a substantial portion of the opening.

12 Claims, 7 Drawing Sheets

EXTRUDER DIE INSERT PLATE SYSTEM

CROSS REFERENCES TO RELATED APPLICATIONS

Cross reference is made to U.S. application Ser. No. 08/622,295, filed Mar. 27, 1996, now U.S. Pat. No. 5,700,413 entitled "Extruder Die Plate With Removable Splitters", by Fumii Higuchi et al.

BACKGROUND OF THE INVENTION

1. Field of the Invention

The present invention relates to a method and apparatus for manufacturing resins and resin compounds. More particularly, the invention relates to an apparatus and method for extruding resins and resin compounds through a die.

2. Description of the Prior Art

In the process of electrophotographic printing, a photoconductive surface has an electrostatic latent image recorded therein. Toner particles are attracted from carrier granules to the latent image to develop the latent image. Thereafter, the toner image is transferred from the photoconductive surface to a sheet and fused thereto.

Typically, toner may be produced by melt-mixing the polymer and pigment whereby the pigment is dispersed in the polymer. The polymer having the colorant dispersed therein is then pulverized. Recently in U.S. Pat. No. 5,227,460 (Mahabadi et al.), incorporated herein by reference, a low melt toner resin with minimum fix temperature and wide fusing latitude containing a linear portion and a cross-linked portion containing high density cross-linked microgel particles, but substantially no low density cross linked polymer was disclosed. A method of manufacturing that toner and its resin was disclosed in U.S. Pat. No. 5,376,494 (Mahabadi et al.), incorporated herein by reference. The method of fabricating the low fix temperature toner resins includes a reactive melt mixing process wherein polymer resins are cross-linked at high temperature and high shear. The resins are particularly suitable for high speed fusing, show excellent offset resistance and wide fusing latitude and superior vinyl offset properties.

The polymer and pigment are melt mixed together typically in an extruder which is part of an extruding system. The polymer and pigment are translated and mixed in an auger within a cavity of the extruder. A die plate is located on the exit end of the extruder. A conventional die plate has round holes to enable the extrusion of high viscosity materials and subsequent processing which includes thinning, cooling and crushing. A conventional strand die plate with small holes would be prone to plugging and would generate extremely high back pressure. This would result in vacuum vent flow and other processing problems that create considerable down time to the extruding machine.

Often, the die plate has to be removed from the extruder for off-line cleaning, which is a length and labor intensive activity. To avoid the plugging and time consuming off-line cleaning associated with the die plates with small holes, die plates with much larger holes have been used.

When large holes are used for the die plate, a large slab of high viscosity extrudate exits from the extruder. This extrudate must be squeezed and spread by nip rolls. This large high viscosity slab often slips when entering the nip rolls. Subsequent processing of this cross sectional slab is very difficult. The slab is typically much thinner at the outer edges of the slab making the processing even more difficult The following disclosures may be relevant to various aspects of the present invention:

U.S Pat. No. 5,145,762

Patentee: Grushkin

Issue Date: Sep. 8, 1992

U.S. Pat. No. 4,973,439

Patentee: Chang et al.

Issue Date: Nov. 27, 1990

U.S. Pat. No. 4,894,308

Patentee: Mahabadi et al.

Issue Date: Jan. 16, 1990

U.S. Pat. No. 3,778,287

Patentee: Stansfield et al.

Issue Date: Dec. 11, 1973

U.S. Pat. No. 5,227,460

Patentee: Mahabadi et al.

Issue Date: Jul. 13, 1993

U.S. Pat. No. 5,376,494

Patentee: Mahabadi et al.

Issue Date: Dec. 27, 1994

U.S. Pat. No. 5,468,586

Patentee: Proper et al.

Issue Date: Nov. 21, 1995

U.S. Pat. No. 5,650,484

Patentee: Hawkins et al.

Issue Date: Jul. 22, 1997

The relevant portions of the foregoing disclosures may be briefly summarized as follows:

U.S. Pat. No. 5,145,762 (Grushkin) discloses a process for the preparation of toner compositions. The process comprises melt blending toner resin particles, magnetic particles, wax, and charge additives. The process further comprises adding a coupling component to the aforementioned mixture, injecting water therein, and cooling.

U.S. Pat. No. 4,973,439 (Chang et al.) discloses an apparatus for obtaining toner particles with improved dispersion of additive components therein comprised of a toner extrusion device containing therein a blending chamber, a mixing screw, a heater, a toner supply, and an injector for injecting additive components including charge control agents into the extrusion device enabling a decrease in the melting temperature of the toner resin particles contained therein.

In U.S. Pat. No. 4,894,308 (Mahabadi et al.), a process for preparing an electrophotographic toner is disclosed which comprises premixing and extruding a pigment, a charge control additive and a resin. The pigment and the charge control additive may be premixed prior to being added to the extruder with the resin; alternatively, the pigment and charge control additive may be premixed by adding them to the extruder via an upstream supply means and extruding them, and subsequently adding the resin to the extruder via a downstream supply means.

In U.S. Pat. No. 3,778,287 (Stansfield et al.) dispersions of inorganic pigments, lakes or toners in organic liquids containing polyesters dissolved therein having acid values up to 100 derived from certain hydroxy-containing, saturated or unsaturated aliphatic carboxylic acids are described. While liquid colorants offer the distinct advantage of being more readily incorporated into the medium to be colored than dry pigments, their commercial significance is seriously limited due to the problems of handling and storing potentially hazardous liquid chemicals. Thus, from an economic and safety standpoint, it is desirable to have the colorants in a dry, storage stable form which is readily dispersible in a wide variety of coating media without detriment to any of the desirable properties of coating produced therefrom.

U.S. Pat. No. 5,227,460 (Mahabadi et al.) discloses a low melt toner resin with minimum fix temperature and wide fusing latitude containing a linear portion and a cross-linked portion containing high density cross-linked microgel particles, but substantially no low density cross linked polymer.

U.S. Pat. No. 5,376,494 (Mahabadi et al.) discloses a method of fabricating low fix temperature toner resins by a reactive melt mixing process wherein polymer resins are cross-linked at high temperature and high shear. The resins are particularly suitable for high speed fusing, show excellent offset resistance and wide fusing latitude and superior vinyl offset properties.

U.S. Pat. No. 5,468,586 (Proper et al.) discloses an apparatus for the preparation of a mixture of toner resin and a liquid colorant. The apparatus includes a toner extruder having the resin being conveyed therethrough and a colorant feeder for adding the colorant to the toner resin in the toner extruder to form the toner mixture. The color of the extrudate is measured, compared to a standard and the amount of colorant added is modified accordingly.

U.S. Pat. No. 5,650,484 (Hawkins et al.) discloses an apparatus for the preparation of a mixture of toner resin and initiator, to form a toner resin or toner mixture including cross-linked microgel particles is provided. The apparatus includes a toner extruder having the resin being conveyed therethrough and an adder for adding the initiator to the toner resin in the toner extruder to form the toner resin or mixture. The apparatus also includes a measurer for measuring the cross-linked microgel particles in the toner mixture substantially immediately after mixing in the toner extruder and transmitting a signal indicative of the quantity of cross-linked microgel particles in the toner resin or mixture. The apparatus also includes a controller for controlling the addition rate of initiator in response to the signals from the measurer.

SUMMARY OF THE INVENTION

In accordance with one aspect of the present invention, there is provided a die for the preparation of a toner resin in an extruder having a housing defining a housing aperture therein and a conveyor for conveying the resin through the housing aperture to form a stream of resin. The die includes a member connected to a first end of the housing. The member defines an opening therethrough. The cross sectional area of the opening is progressively reduced in the direction of the stream of resin for at least a substantial portion of the opening. In accordance with another aspect of the present invention, there is provided a method for preparing a toner resin. The method includes the steps of adding base resin and chemical initiator to a toner extruder, mixing the base resin and the chemical initiator within the extruder to form the mixed resin, conveying the mixed resin within the extruder to an extruding die, and extruding the mixed resin through the extruding die to form a stream of resin with a cross sectional area that is substantially smaller as it leaves the die than the cross sectional area of the stream as it enters the die.

BRIEF DESCRIPTION OF THE DRAWINGS

The invention will be described in detail herein with reference to the following Figures in which like reference numerals denote like elements and wherein.

DESCRIPTION OF THE PREFERRED EMBODIMENT

Figure 1:
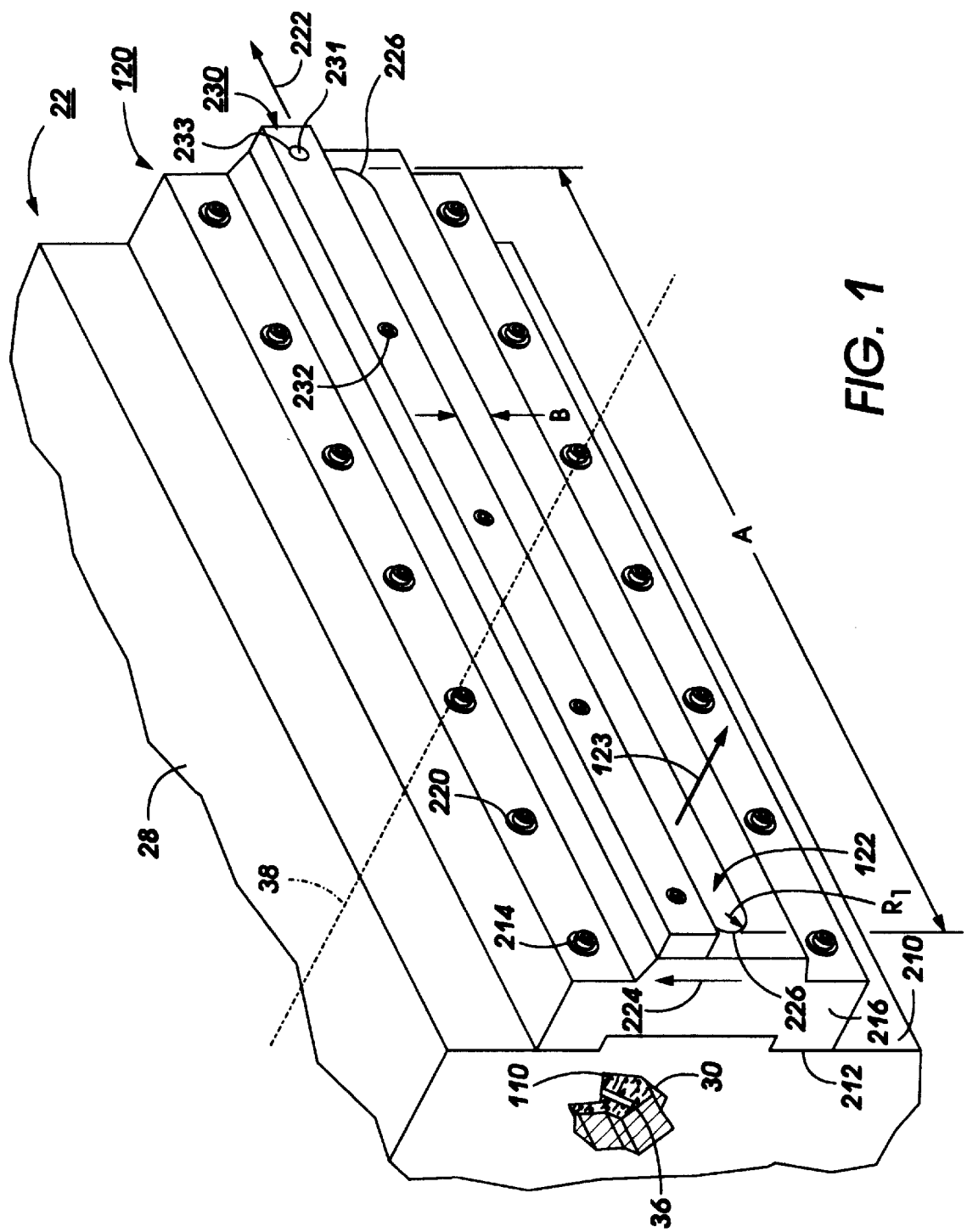
FIG. 1 is a perspective view of a die for a toner extruder according to the present invention.

The toner that is typically extruded using the extruder die of this invention includes a resin and preferably a charge control additive and other known additives. The manufacture of black toners will be discussed henceforth. It should be readily apparent that the manufacture of colored toner may likewise include the process of the present invention.

The base resin that is typically extruded using the extruder die of this invention is a polymer with a melt viscosity as measured with a mechanical spectrometer at 10 radians per second at from about 5,000 to about 200,000 poise. Such polymers include reactive polymers, preferably a linear reactive polymers such as, for example, linear unsaturated polyester. For example, the base resin may have a degree of unsaturation of about 0.1 to about 30 mole percent, preferably about 5 to about 25 mole percent. The linear unsaturated polyester base resin is typically characterized by number-average molecular weight (Mn) as measured by gel permeation chromatography (GPC) in the range typically from 1000 to about 20,000, and preferably from about 2000 to about 5000, weight-average molecular weight (Mw) in the range typically from 2000 to about 40,000, and preferably from about 4000 to about 15,000. The molecular weight distribution (Mw/Mn) is in the range typically from 1.5 to about 6, and preferably from about 2 to about 4. Onset glass transition temperature (Tg) as measured by differential scanning calorimetry (DSC) is in the range typically from 50° C. to about 70° C., and preferably from about 51° C. to about 60° C. Melt viscosity as measured with a mechanical spectrometer at 10 radians per second is from about 5,000 to about 200,000 poise, and preferably from about 20,000 to about 100,000 poise, at 100° C. and drops sharply with increasing temperature to from about 100 to about 5000 poise, and preferably from about 400 to about 2,000 poise, as temperature rises from 100° C. to 130° C.

Linear unsaturated polyesters used as the base resin are low molecular weight condensation polymers which may be formed by the step-wise reactions between both saturated and unsaturated diacids (or anhydrides) and dihydric alcohols (glycols or diols). The resulting unsaturated polyesters are reactive (e.g., cross-linkable) on two fronts: (i) unsaturation sites (double bonds) along the polyester chain, and (ii) functional groups such as carboxyl, hydroxy, etc. groups amenable to acid-base reactions. Typical unsaturated polyesters useful for this invention are prepared by melt polycondensation or other polymerization processes using diacids and/or anhydrides and diols. Suitable diacids and anhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like and mixtures thereof. Suitable diols include but are not limited to, for example propylene glycol, ethylene glycol, diethylene glycol, neopentyl glycol, dipropylene glycol, dibromoneopentyl glycol, propoxylated bisphenol-A, 2,2,4-trimethylpentane-1,3-diol, tetrabromo bisphenol dipropoxy ether, 1,4-butanediol, and the like and mixtures thereof, soluble in good solvents such as, for example, tetrahydrofuran, toluene and the like.

Preferred linear unsaturated polyester base resins are prepared from diacids and/or anhydrides such as, for example maleic anhydride, fumaric acid, and the like and mixtures thereof, and diols such as, for example, propoxylated bisphenol-A, propylene glycol, and the like and mixtures thereof. A particularly preferred polyester is poly (propoxylated bisphenol A fumarate).

Substantially any suitable unsaturated polyester can be used in the process of the invention, including unsaturated polyesters known for use in toner resins and including unsaturated polyesters whose properties previously made them undesirable or unsuitable for use as toner resins (but which adverse properties are eliminated or reduced by cross-linking them). A low melt toner resin with minimum fix temperature and wide fusing latitude containing a linear portion and a cross-linked portion containing high density cross-linked microgel particles, but substantially no low density cross linked polymer was disclosed recently in U.S. Pat. No. 5,227,460.

The high density cross-linked microgel particle toner resins may be made by a process that includes a reactive melt mixing process. Such a method of manufacturing that toner and its resin was disclosed in U.S. Pat. No. 5,376,494.

Figure 2:
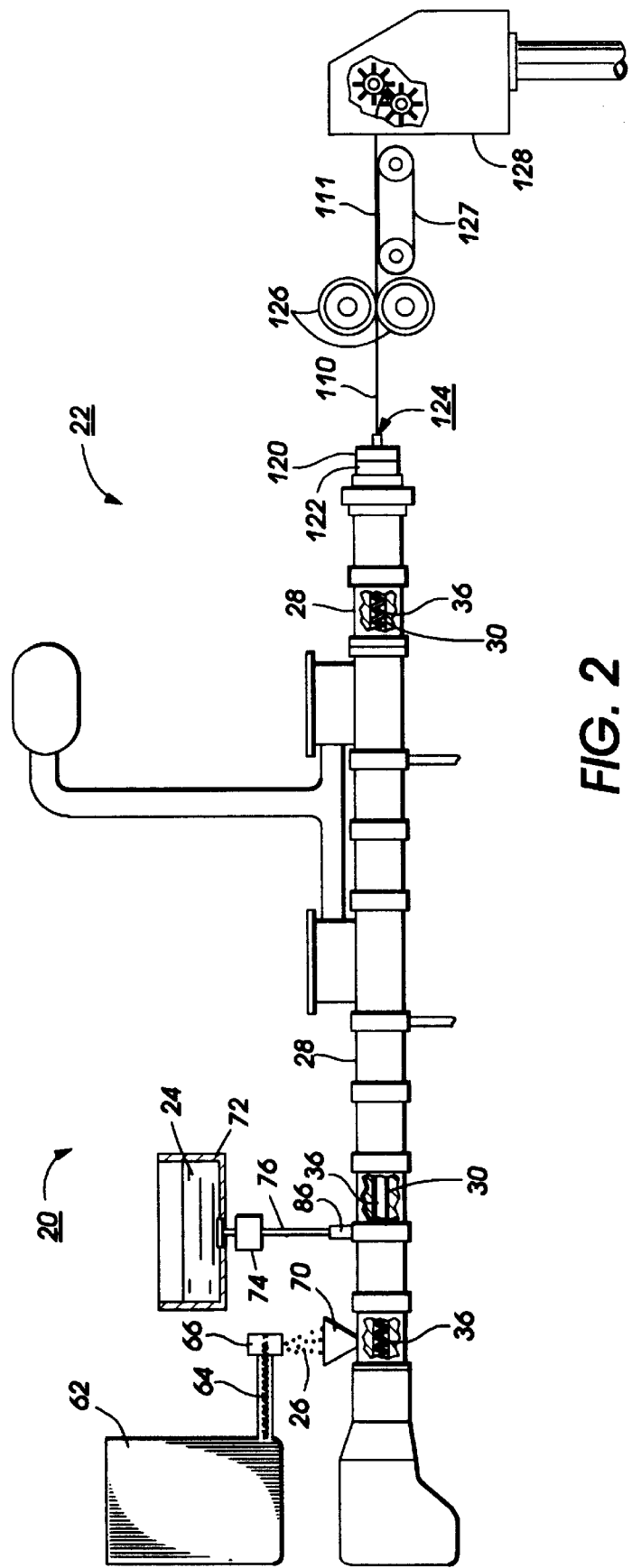
FIG. 2 is a schematic elevational view of the toner extruder according to the present invention.

Referring first to FIG. 2, a toner preparing apparatus 20 in the form of an extruding system is shown. The toner preparing apparatus 20 includes an extruder 22 for mixing chemical initiator 24 with dry resin 26 and for converting the dry resin 26 into a liquid form having a portion of the toner in gel form. Generally, any extruder, such as a single or twin screw extruder, suitable for preparing electrophotographic toners, may be employed for mixing the chemical initiator 24 with the resin 26. For example, a Werner & Pfleiderer WP-28 extruder is well-suited for melt-blending the resin 26, a chemical initiator 24, and additives. The resin 26 is stored adjacent the extruder 22 in a dry toner resin feeder hopper 62. The resin 26 is uniformly fed from the hopper 62 by an auger 64 to a resin hopper outlet 66. The resin hopper outlet 66 is located adjacent a extruder resin inlet 70 into which the resin 26 is deposited. After the resin 26 is added to the extruder 22, the chemical initiator 24 is added to the extruder 22. The chemical initiator may be wet or dry. The use of dry initiator will be described herein, but it should be appreciated that the chemical initiator may likewise be in liquid form.

The chemical initiator 24 may be any suitable chemical capable of assisting the conversion of an unsaturated toner resin into a partially saturated toner resin. The percentage of conversion preferred may vary widely from approximately 40 percent for black toners to approximately 5–7 percent for colored toners. An organic peroxide has been found to be effective in assisting such a conversion from unsaturated toner resin to partially saturated toner resin. The organic peroxide for example may be a benzoyl peroxide.

The chemical initiator 24 is stored adjacent the extruder 22 in a dry chemical initiator feeder hopper 72. The chemical initiator 24 is uniformly fed from the hopper 72 by a valve 74 to a chemical initiator inlet 86. The extruder 22 typically includes a body 28 which defines a centrally located aperture 30 therethrough. A feed and mixing mechanism 36 is located in the aperture 30. Preferably the feed mechanism is in the form of a screw rotatably located in the aperture 30. The screw 36 rotates within aperture 30 about its axis. The extruder 22 for simplicity is described with a single screw, but many commercial extruders include twin screws, parallel to each other and closely spaced from each other. The chemical initiator outlet 86 is located adjacent the extruder resin inlet 70 into which the chemical initiator 24 is deposited.

As the chemical initiator 24 is mixed with resin 26, an extrudate 110 is formed which contains the chemical initiator 24 evenly reacted with the resin 26. The screw 36 within the extruder 22 is preferably turned at the fastest rate which allows the molten resin to achieve the desired temperatures. The extrudate continues to pass through the extruder 22 to a die plate 120 located at an outlet 122 of the extruder 22. The die plate 120 includes a large rectangular aperture 124 through which the extrudate 110 exits the extruder 22. At the die plate 120, the temperature is raised from approximately 110° C. to above 200° C. temperature to obtain a temperature which thins the extrudate and causes it to flow freely through the aperture 124. The pressure in the preceding mixing zone can be increased by restricting the size of the aperture 124, at the expense of throughput. The aperture 124 is chosen of suitable size to provide flow sufficient to provide for a commercially acceptable process.

The extrudate 110 from the extruder 22 is fed between a pair of rolls 126. The rolls 126 are preferably chilled by any suitable means such as by circulating water. The rolls 126 widen, thin and cool the extrudate 110 into a partially cooled extrudate 111. The partially cooled extrudate 111 is fed into a further cooling system represented by a cooling belt 127. At the belt 127, the now brittle extrudate 111 is broken into granules by a cutting machine such a FITZ® mill 128. After the resin has been extruded, the resin mixture is reduced in size by any suitable method including those known in the art. An important property of toners is brittleness which causes the resin to fracture when impacted. This allows rapid particle size reduction in attritors, other media mills, or even jet mills used to make dry toner particles. It should be appreciated that the particle size reduction may possibly include the use of a pulverizer (not shown). The pulverizer may be a hammer mill such as, for example, an ALPINE® Hammer Mill. The hammer reduces the toner particles to a size of about 100 microns to about 300 microns. Applicants have found that the invention may be practiced without the use of the hammer mill.

Figure 3:
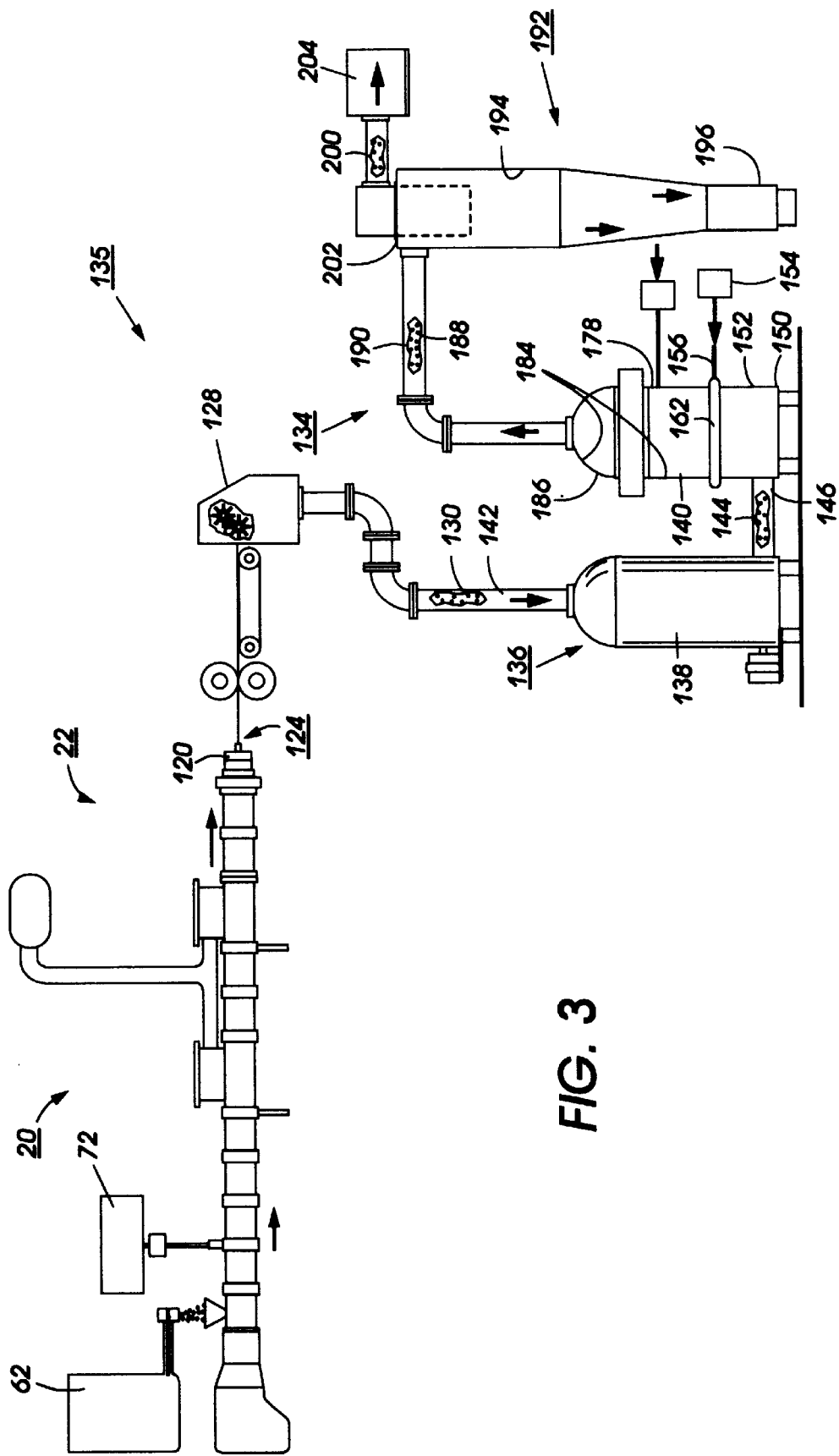
FIG. 3 is a schematic elevational view of a toner manufacturing system including a micronization system and the toner extruder of the present invention.

Referring now to FIG. 3, a micronization system 134 is shown in use with the toner preparing apparatus 20 to form a toner manufacturing system 135. The micronization system 134 serves to reduce the particle size of the pellets 130 into toner particles of an appropriate size, such as four to eight microns. The micronization system 134 is connected to the toner preparing apparatus 20 to form a toner manufacturing system 135.

As earlier stated, an important property of toners is brittleness, which causes the resin to fracture when impacted. This allows rapid particle size reduction in aerators, other media mills, or even jet mills to make dry toner particles.

The micronization system 134 includes a micronizer 136 which provides for the rapid particle size reduction of the pellets 130 into toner particles. Preferably, the micronizer is a jet-type micronizer such as a jet mill. Jet mills containing a milling section into which water vapor jets or air jets are blown at high speeds and the solid matter to be micronized is brought in across an injector by a propellant. Compressed air or water vapor is usually used as the propellant in this process. The introduction of the solid matter into the injector usually occurs across a feeding hopper or entry chute.

For example, the micronizer 136 may be a Sturtevant 15 inch jet mill having a feed pressure of about 114 psi and a grinding pressure of about 119 psi may be used in the preparation of the toner resin particles. The nozzles of this jet mill are arranged around the perimeter of a ring. Feed material is introduced by a pneumatic delivery device and transported to the injector nozzle. The particles collide with one another and are attrited. These particles stay in the grinding zone by centrifugal force until they are small enough to be carried out and collected by a cyclone separator. A further size classification may be performed by an air classifier.

Preferably, however, the micronizer 136 is in the form of an AFG-800 grinder. The AFG-800 grinder is a fluidized air mill made by AFG (Alpine Fliebbertt-Gegenstrahlmuhle). The micronizer 136 includes a feed chamber 138 and a grind chamber 140. A pipe or tube 142 connects the rotary cutter 128 with the feed chamber 138. The pipe 142 is made of any suitable durable material which is not interactive with the toner composition, such as stainless steel. The pellets 130 are propelled toward the feed chamber 138 by any suitable means such as by augers (not shown) or by blowers (not shown). The pellets 130 accumulated in the feed chamber 138 are extracted from the feed chamber 138 by a screw 144 located in a tube or pipe 146 interconnecting the feed chamber 138 with the grind chamber 140. The screw 144 and the pipe 146 are made of any suitable durable material which is not chemically interactive with the toner, such as stainless steel. The pellets 130 enter lower portion 150 of the grind chamber 140.

A pressurized fluid, preferably in the form of compressed air is added to the grind chamber 140 in a lower central portion 152 of the grind chamber 140. The compressed air is supplied by any suitable compressed air source 154, such as an air compressor. Compressed air conduit 156 interconnects the compressed air source with a ring 162 located around the grind chamber 140. Extending inwardly from the ring 162 are a series of inwardly pointing nozzles (not shown) through which the compressed air enters the grind chamber 140. The compressed air causes the pellets 130 to accelerate rapidly upwardly within the grind chamber 140.

In an upper portion 178 of the grind chamber 140 a series of rotating classifier wheels (not shown) set the toner air mixture into rapid rotation. The classifier wheels (not shown) include fins (not shown) along the periphery of the classifier wheels. The wheels cause the larger particles, pellets 130, to be propelled to inner periphery 184 of the grind chamber 140 and to return to the lower portion 150 of the grind chamber 140. The pellets 130 impact each other and the components of the micronizer 136 and thereby micronize the toner into micronized toner 188. The micronized toner 188, on the other hand, is permitted to move upwardly within the grind chamber 140 into manifold 186.

A long connecting pipe 190 is connected on one end thereof to manifold 186 and on the other end thereof to a product cyclone 192. The long connecting pipe 190 serves to provide a conduit between the grind chamber 140 and the product cyclone 192 for the micronized toner 188. The long connecting pipe 190 may be of any suitable durable material, such as stainless steel.

The product cyclone 192 is designed to separate particles from the air stream in which they are carried. The product cyclone 192 may be any suitable commercially available cyclone manufactured for this purpose and may, for example, include a (quad) cyclone which consists of four cyclones combined. Within the product cyclone 192, the micronized toner 188 circulates in a spinning manner about inner periphery 194 of the cyclone 192. The larger micronized toner 188 has a greater mass and is thereby propelled to the inner periphery 194 of the cyclone 192, falling into lower portion 196 of the product cyclone 192. Air and very small dust particles 200 having a lesser mass and a particle size of, perhaps, less than 1 microns are drawn upwardly through upper opening 202 of the cyclone 192 into dust collector 204. The micronized toner 188 collects in the lower portion 196 of the cyclone 192 and is extracted therefrom.

According to the present invention and referring now to FIG. 1, the die plate 120 is shown in greater detail. The die plate 120 is secured to end 210 of the body 28 of the extruder 22 The die plate 120 is located such that the die plate 120 covers the aperture 30 of the body 28 of the extruder 22. A first face 212 of the die plate 120 is secured to the body 28 by any appropriate means, for example, by welding or by fasteners. Preferably, the die plate 120 is secured to the body through the use of fasteners, for example, by socket head cap screws 214 as shown.

The die plate 120 may be made of integral construction but, preferably, the die plate 120 is an assembly of several components to ease manufacturing and to permit customizing of the configuration of the die plate as well as to repair and replace worn components.

The die plate 120 preferably includes a body 216 which is secured to end 210 of the body 28 of the extruder 22 by cap screws 214 fitted into body holes 220 in the body 216. The first face 212 of body 216 is preferably located normal to axis 38 of screw 36 of the extruder 22. First face 212 is further centrally located about axis 38. The body 216 defines opening 122 of the die plate 120. The opening 122 is elongated in a second direction 222 which is normal to axis 38 of the screw 36 of the extruder 32. The opening 122 preferably has a length A in the second direction 222 which is approximately four to ten times as great as height B in third direction 224. Ends 226 of the opening 122 preferably have an arcuate shape, for example, the ends 226 may be defined by radius $R_1$ which is approximately equal to one half the height B of the opening 122.

According to the present invention the opening 122 has a cross sectional area that decreases in the direction of the stream of extrudate as shown by arrow 123. The non-uniform cross section of the opening 122 can be incorporated into an integral die plate 120, but preferably to simplify the construction of the plate 120 and to provide for replaceable components for simpler disassembly during clogging of the extruder and other malfunctions of the extruder and to allow for less expensive experimental hardware of alternate cross sectional shapes of the opening, the die plate 120 includes body 216 and an insert 230 attached thereto.

The insert 230 serves somewhat as a nozzle to guide the extrudate 110 through the die plate 120. The insert 230 is secured to the body 216 by any suitable means, for example, by fasteners such as stainless flat head screws 232. To provide for an accurate positioning of the insert 230 relative to the body 216 during assembly of the insert into the body, the body preferably includes precision holes (not shown) to which precision dowels 231 are secured. The insert includes precision holes 233 into which the dowels are slidably fitted during assembly. It should be appreciated, however, that the insert 230 may be welded or glued to the body 216.

The body 216 and the insert 230 are preferably made of any suitable durable material with sufficient strength to withstand the high pressures and temperatures of the extruder 22 as well as of a material non-chemically reactive with the extrudate 110 as well. For example, the body 216 and the insert 230 may be made of stainless steel.

Figure 4:
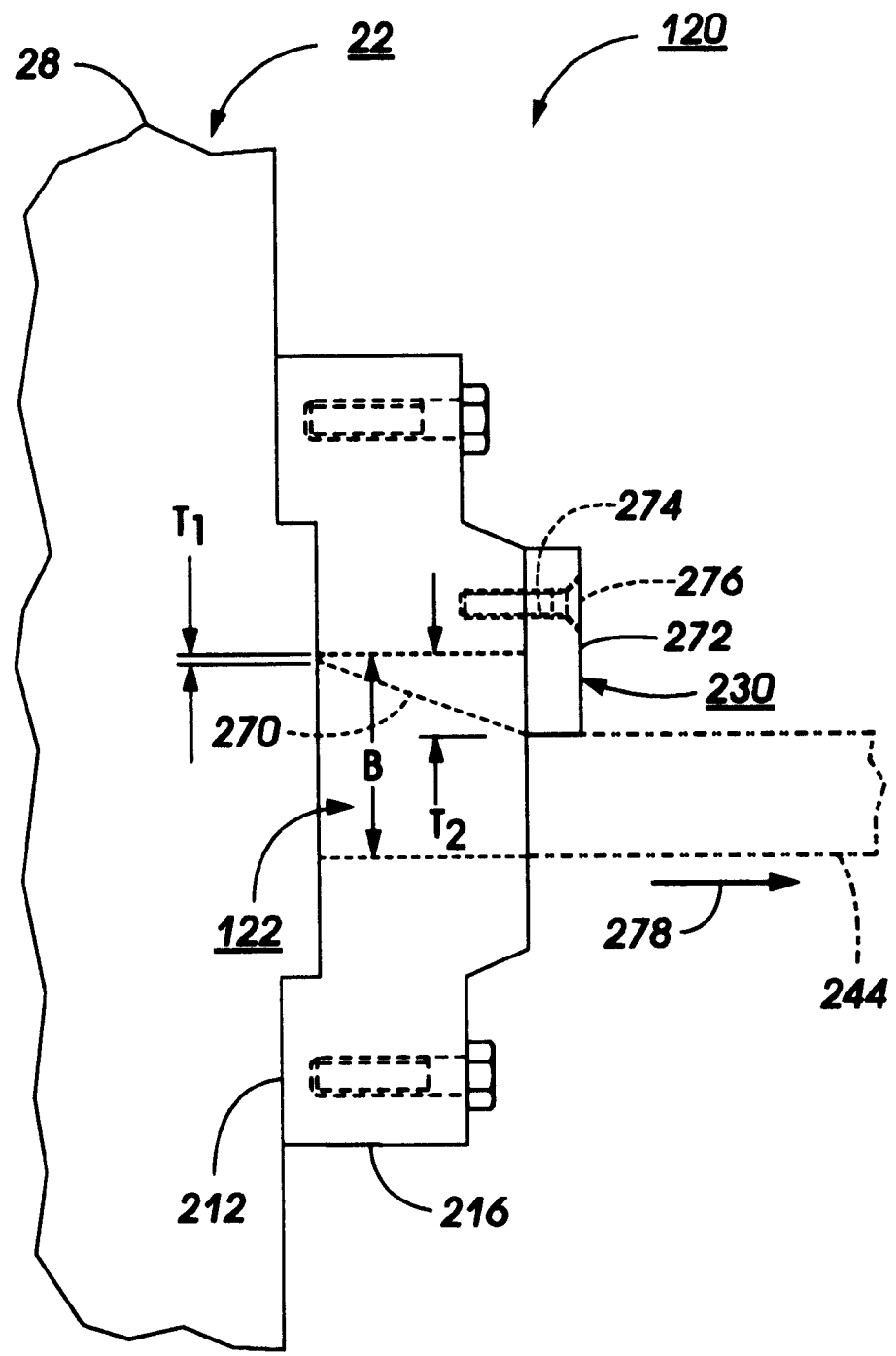
FIG. 4 is an elevational view of a die for the die of FIG. 1.

Referring now to FIG. 4, insert 230 is shown located in position on the body 216. The insert 230 includes a wedge shaped portion 270 and a mounting portion 272. The wedge shaped portion 270 is located within opening 122 while the mounting portion 272 is located on the body 216 and includes openings 274 to which screws 276 are slidably fitted for securing the insert 230 to the body 216. It should be appreciated that the wedge shaped portion 270 may be secured to the mounting portion 272 in any suitable manner or may be integrally made therewith.

The wedge shaped portion may have any suitable shape which results in a reduction in the cross sectional area of the opening 122 in the direction of arrow 278. The shape of the wedge shaped portion 270 is preferably empirically determined based upon obtaining the proper flow of the stream 244. It has been found that a shape of the wedge shaped portion 270 with a triangular cross section is acceptable. For example, the wedge shaped portion 270 may include a thickness $T_1$ of a few millimeters near the first face 212 of the body 216 and a thickness $T_2$ near the opposed end of the body 216 which thickness $T_2$ is approximately half the thickness B of the opening 122. The use of the insert 230 serves to permit the flow of extrudate 110 through the die plate 120 with less back pressure than a smaller opening with a uniform cross section.

Figure 5:
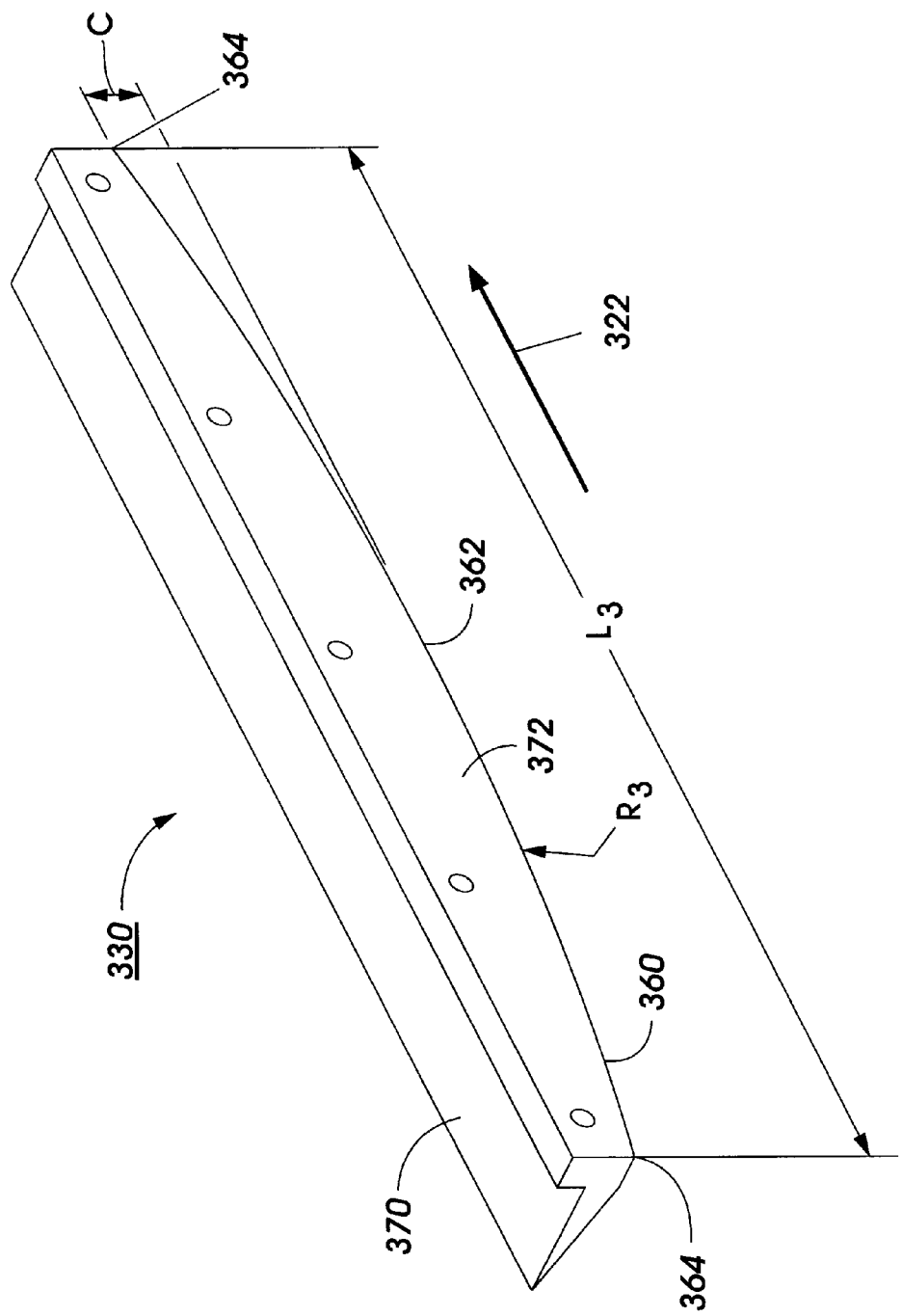
FIG. 5 is a perspective view of an alternate die insert for the die of FIG. 1.

Referring now to FIG. 5, an alternate embodiment of an insert according to the present invention is shown in insert 330. Insert 330 is similar to insert 230 of FIG. 4 except that lower surface 360 of insert 330 is arcuate rather than flat as is the corresponding surface of insert 230. The lower surface 360 may be any arcuate shape that provides for the lower surface 360 to be lower at the mid point 362 of the surface 360 in the second direction 322 than at ends 364 in the second direction of surface 360. For example the lower surface may be defined by radius $R_3$. For an insert 330 with a length L the end points 364 are spaced from a line through mid point 362 in the second direction 322 a distance C. For an insert with a value of 4 inches for length L a value of C of 0.130 inches has been found to be effective. The relief in the second direction serves to compensate for the tendency for the ends of the slap in the second direction to be starved for material, thus making the extrudate to be more uniform in cross section after subsequent processing.

Figure 6:
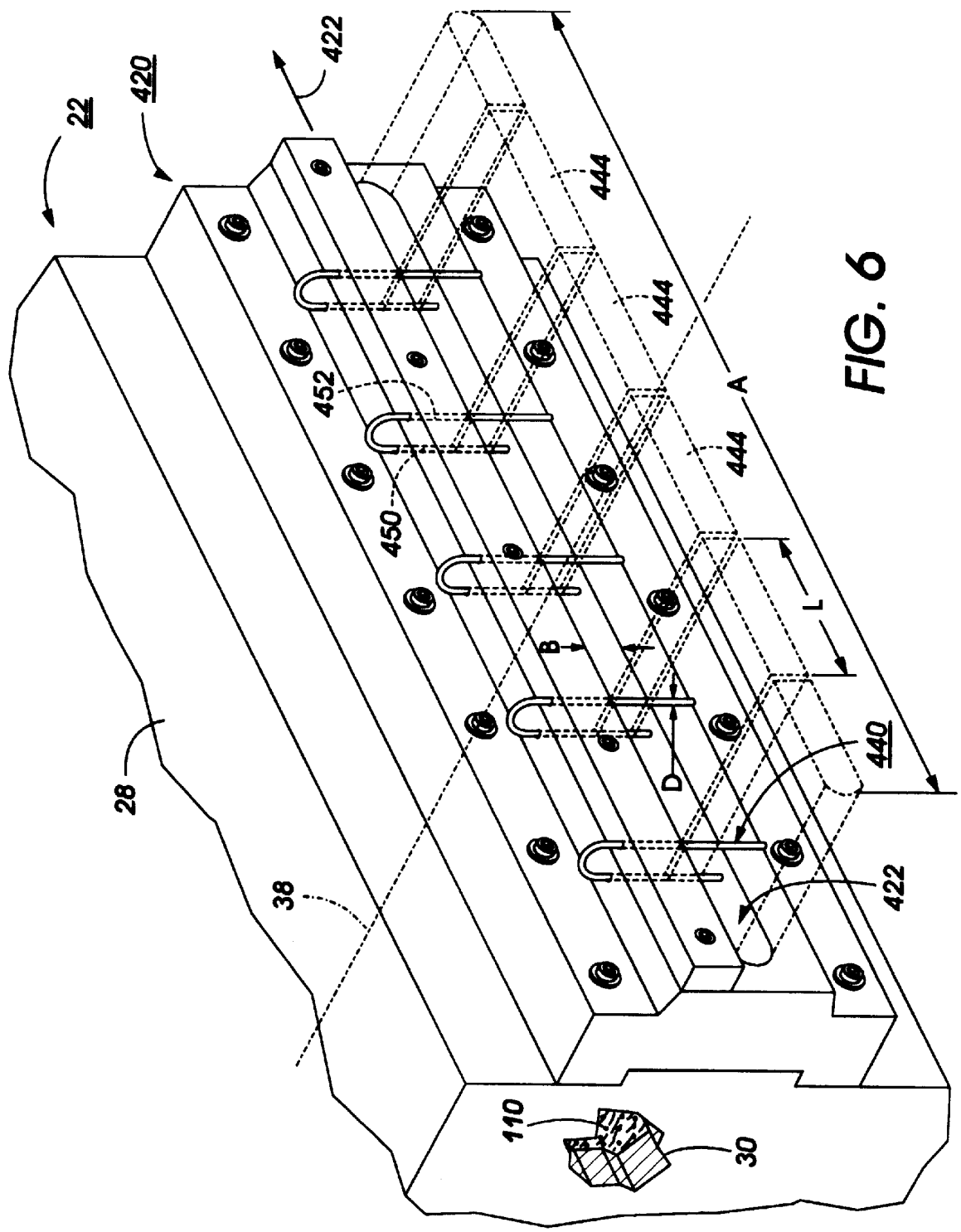
FIG. 6 is a perspective view of an alternate embodiment of a die for a toner extruder according to the present invention incorporating a extrudate stream splitter.

Referring now to FIG. 6, an alternate embodiment of the die plate according to the present invention is shown in die plate 420. Die plate 420 is similar to the die plate 120 except that die plate 420 includes a splitter 440 to divide the stream of extrudate 110 into two separate streams.

The use of an extruder with a die plate having a splitter provides for a plurality of streams which are spaced apart from each other and each of these streams has a smaller cross section than the original stream. The smaller streams of extrudate from the splitter provide for a stream of extrudate which may be more easily compressed through rolls than a single stream of extrudate. The use of the splitter permits each stream of extrudate to have an open end which may permit the widening of the stream of extrudate more easily than one large stream of extrudate.

The splitter 440 is located adjacent opening 422 of the die plate 420. While the invention may be practiced with solitary splitter 440, preferably, a plurality of splitters 440 are used to divide the extrudate 110 into a plurality of streams 444 of extrudate. The splitters 440 may have any suitable shape but preferably have a dimension in second direction 422 which is relatively small in order that the stream of extrudate 110 can be easily divided into streams 444. For example, the splitter 440 may be a blade or similar shape with a width substantially smaller than its length. For example, the splitter 440 may be in the shape of a pin. The pin 440 has a diameter D substantially smaller than the height B of the opening 422. The pin 440 may have a straight configuration or, as shown in FIG. 6, be U-shaped with a first pin portion 450 located upstream of a second pin portion 452. The first and second pin portions 450 and 452, respectively, assist in the assembly and disassembly of the pin into the die plate 420 as well as to assist in guiding the extrudate 110 into the streams 444 of resin.

While the invention may be practiced with a solitary splitter 440, preferably, the die plate 420 includes a plurality of splitters 440 which preferably are equally spaced in the second direction 422. For example, as shown in FIG. 6, five splitters 440 are equally spaced a distance L from each other.

The body 416 is preferably made of any suitable durable material with sufficient strength to withstand the high pressures and temperatures of the extruder 22 as well as of a material non-chemically reactive with the extrudate 110 as well. For example, the body 416 may be made of stainless steel.

The splitter pin 440 may be made of any suitable durable material capable of withstanding the pressures and elevated temperatures of the extruder 22 as well as being chemically inert to the extrudate 110. For example, the splitter 440 may be made of stainless steel.

Figure 7:
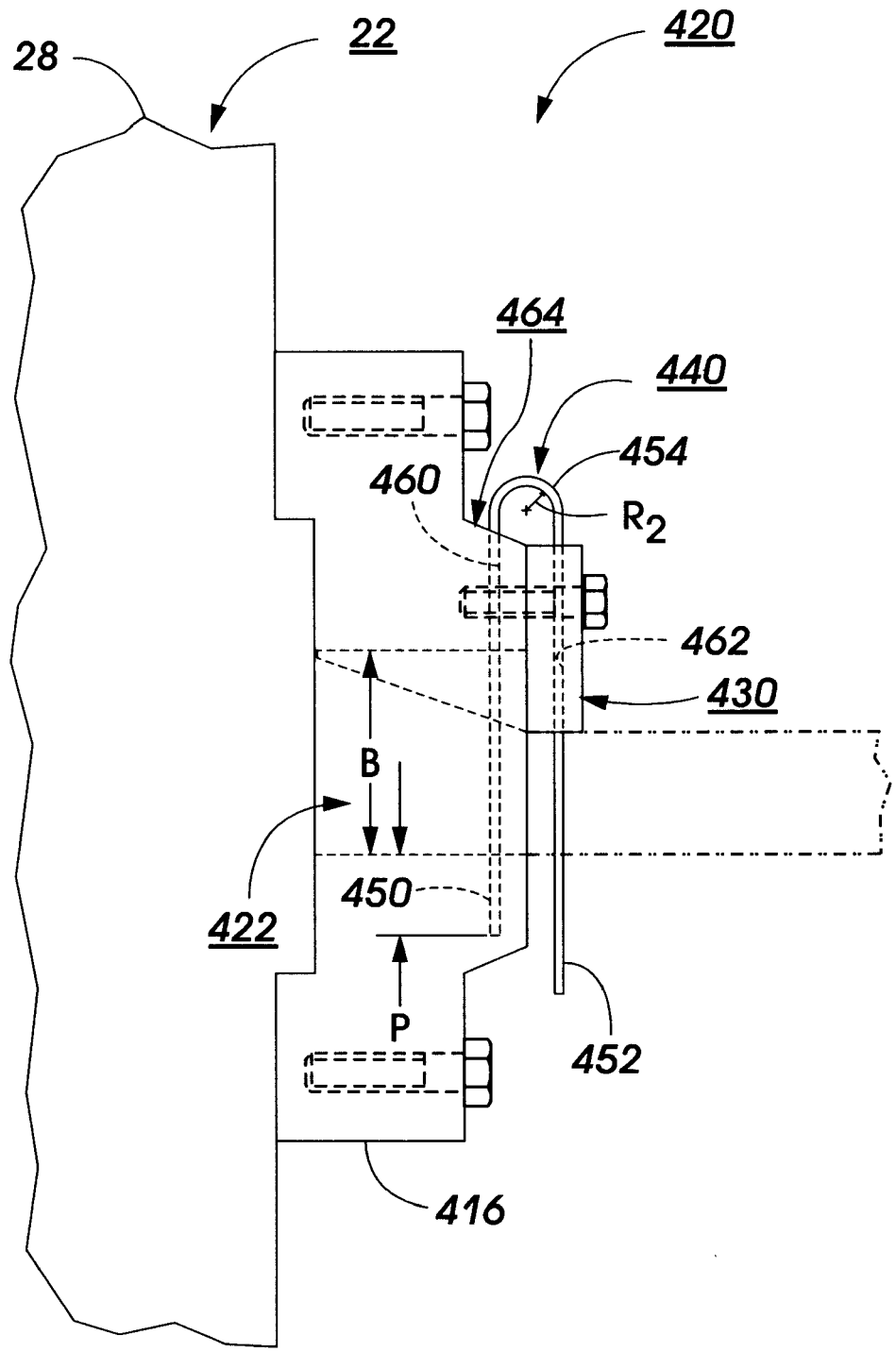
FIG. 7 is an elevational view of a die insert for the die of FIG. 6.

Referring now to FIG. 7, the splitter 440 is shown in greater detail. The splitter 440 includes the first pin portion 450 which has a length which is substantially shorter than length of second pin portion 452. First and second pin portions 450 and 452 are parallel and spaced apart being interconnected by loop portion 454 interconnecting the first and second pin portions 450 and 452. The loop portion 454 is defined by radius $R_2$.

The pin 440 is shown assembled into body 416. First pin portion 450 of the splitter pin 440 is slidably fitted into body pin opening 460 of the body 416 while second pin portion 452 is slidably fitted into insert pin opening 462 of the insert 430. The splitter pin 440 is installed from above the die plate 420 with the splitter pin 440 located in upper portion 464 of the body 416 of the die plate 420. First pin portion 450 is engaged in body pin opening 460 both above and below the opening 122 of the body 416. The first pin portion 450 is engaged a distance P below the opening 122 to properly secure the pin in the opening 422.

The use of a member in the form of a die connected to a first end of said housing with an opening therethrough, the cross sectional area of the opening of the die being progressively reduced in the direction of the stream of resin provides for reduced back pressure through the die for a similar slab size.

The use of a die with a steadily decreasing cross section in the direction of the flow of the extrudate provides for no dead space for material to be trapped, resulting in a smooth transition of flow throughout the die.

The use of a die with an arcuate surface on a face adjacent the opening therein, provides for a flow of extrudate that may be modified to allow an optimum shape for further processing of the extrudate.

The use of a die with a thinner shape in the middle than at the ends adjacent the opening therein, provides for a flow of extrudate that is not starved in the outer ends thereof.

The use of a die having a removable insert therein provides for quick and easy changeover, eliminating the need for total removal of the die plate and for a complement of various dies for different applications with a lower total cost.

The use of an extruder with a die plate having a splitter provides for a plurality of streams which are spaced apart from each other and would have a smaller cross section than the original stream. The smaller streams of extrudate from the splitter provide for a stream of extrudate which may be more easily compressed through rolls than a single stream of extrudate. The use of the splitter permits each stream of extrudate to have an open end which may permit the widening of the stream of extrudate more easily than one large stream of extrudate.

The use of a splitter with a small width permits the for the splitting of the extrudate without a significant increase in the pressure within the extruder.

The use of a splitter with a circular cross section permits the use of a small pin with minimal back pressure at maximum strength.

The use of a splitter pin with a U-shape provides for a primary and secondary splitting of the stream which prevents the reforming of a solitary stream of extrudate, while minimizing the back pressure within the extruder.

While the invention has been described with reference to the structures and embodiments disclosed herein, it is not confined to the details set forth, and encompasses such modifications or changes as may come within the purpose of the invention.

We claim:

1. A die for the preparation of a toner resin in an extruder having a housing defining a housing aperture and a conveyor for conveying the resin through the housing aperture to form a stream of resin therein, the die comprising:

a body having a one-piece construction and removably attached to the housing, said body defining a body aperture therethrough, in communication with the housing aperture and connected to a first end of the housing at a first end of said body, the stream of resin flowable through the body aperture; and an insert removably attached to said body at a second end of said body opposed to the first end of said body, said insert being replaceable by merely removing the insert from the second end of the body, said insert including a portion thereof fittable into the body aperture, said insert and said body cooperating to form an opening for the stream of resin to pass therethrough, the cross sectional area of the opening in a direction normal to the direction of the stream of resin through the extruder being substantially smaller than the cross sectional area of the body aperture in a direction normal to the direction of the stream of resin through the extruder, said insert including a first portion thereof positioned within the body aperture and a second portion thereof positioned outside the body aperture.

2. The die of claim 1:

wherein said body defines parallel spaced apart parallel body surfaces defining the body aperture therebetween; and wherein said first portion includes a first portion surface thereof, said first portion surface positioned adjacent one of said parallel body surfaces.

3. The A die for the preparation of a toner resin in an extruder having a housing defining a housing aperture and a conveyor for conveying the resin through the housing aperture to form a stream of resin therein, the die comprising:

a body having a one-piece construction and removably attached to the housing, said body defining a body aperture therethrough, in communication with the housing aperture and connected to a first end of the housing at a first end of said body, the stream of resin flowable through the body aperture; and an insert removably attached to said body at a second end of said body opposed to the first end of said body, said insert being replaceable by merely removing the insert from the second end of the body, said insert including a portion thereof fittable into the body aperture, said insert and said body cooperating to form an opening for the stream of resin to pass therethrough, the cross sectional area of the opening in a direction normal to the direction of the stream of resin through the extruder being substantially smaller than the cross sectional area of the body aperture in a direction normal to the direction of the stream of resin through the extruder, said body defining a mounting surface thereof, said mounting surface normal to the direction of the stream of resin through the extruder, said insert including an insert surface thereof, the insert surface mountable to the mounting surface of said body.

4. A die for the preparation of a toner resin in an extruder having a housing defining a housing aperture and a conveyor for conveying the resin through the housing aperture to form a stream of resin therein, the die comprising:

a body having a one-piece construction and removably attached to the housing, said body defining a body aperture therethrough, in communication with the housing aperture and connected to a first end of the housing at a first end of said body, the stream of resin flowable through the body aperture;

an insert removably attached to said body at a second end of said body opposed to the first end of said body, said insert being replaceable by merely removing the insert from the second end of the body, said insert including a portion thereof fittable into the body aperture, said insert and said body cooperating to form an opening for the stream of resin to pass therethrough, the cross sectional area of the opening in a direction normal to the direction of the stream of resin through the extruder being substantially smaller than the cross sectional area of the body aperture in a direction normal to the direction of the stream of resin through the extruder; and a plurality of fasteners for securing said insert to said body.

5. The die of claims 4:

wherein said fasteners comprises threaded fasteners;

wherein said insert defines a plurality of fastener clearance openings; and wherein said body defines a plurality of threaded openings, the threaded openings cooperating with the fasteners to secure said insert to said body.

6. A die for the preparation of a toner resin in an extruder having a housing defining a housing aperture and a conveyor for conveying the resin through the housing aperture to form a stream of resin therein, the die comprising:

a body having a one-piece construction and removably attached to the housing, said body defining a body aperture therethrough, in communication with the housing aperture and connected to a first end of the housing at a first end of said body, the stream of resin flowable through the body aperture; and an insert removably attached to said body at a second end of said body opposed to the first end of said body, said insert being replaceable by merely removing the insert from the second end of the body, said insert and said body defining an opening therethrough, the cross sectional area of the opening in a direction normal to the direction of the stream of resin through the extruder being substantially smaller than the cross sectional area of the body aperture in a direction normal to the direction of the stream of resin through the extruder, said insert including a first portion thereof positioned within the body aperture and a second portion thereof positioned outside the body aperture.

7. The die of claim 6:

wherein said body defines parallel spaced apart parallel body surfaces defining the body aperture therebetween; and wherein said first portion includes a first portion surface thereof, said first portion surface positioned adjacent one of said parallel body surfaces.

8. A die for the preparation of a toner resin in an extruder having a housing defining a housing aperture and a conveyor for conveying the resin through the housing aperture to form a stream of resin therein, the die comprising:

a body having a one-piece construction and removably attached to the housing, said body defining a body aperture therethrough, in communication with the housing aperture and connected to a first end of the housing at a first end of said body, the stream of resin flowable through the body aperture; and an insert removably attached to said body at a second end of said body opposed to the first end of said body, said insert being replaceable by merely removing the insert from the second end of the body, said insert and said body defining an opening therethrough, the cross sectional area of the opening in a direction normal to the direction of the stream of resin through the extruder being substantially smaller than the cross sectional area of the body aperture in a direction normal to the direction of the stream of resin through the extruder, said body defining a mounting surface thereof, said mounting surface normal to the direction of the stream of resin through the extruder, said insert including an insert surface thereof, the insert surface mountable to the mounting surface of said body.

9. A die for the preparation of a toner resin in an extruder having a housing defining a housing aperture and a conveyor for conveying the resin through the housing aperture to form a stream of resin therein, the die comprising:

a body having a one-piece construction and removably attached to the housing, said body defining a body aperture therethrough, in communication with the housing aperture and connected to a first end of the housing at a first end of said body, the stream of resin flowable through the body aperture;

an insert removably attached to said body at a second end of said body opposed to the first end of said body, said insert being replaceable by merely removing the insert from the second end of the body, said insert and said body defining an opening therethrough, the cross sectional area of the opening in a direction normal to the direction of the stream of resin through the extruder being substantially smaller than the cross sectional area of the body aperture in a direction normal to the direction of the stream of resin through the extruder; and a plurality of fasteners for securing said insert to said body.

10. The die of claims 9:

wherein said fasteners comprises threaded fasteners;

wherein said insert defines a plurality of fastener clearance openings; and wherein said body defines a plurality of threaded openings, the threaded openings cooperating with the fasteners to secure said insert to said body.

11. A die for the preparation of a toner resin in an extruder having a housing defining a housing aperture and a conveyor for conveying the resin through the housing aperture to form a stream of resin therein, the die comprising:

a body defining a body aperture therethrough in communication with the housing aperture and connected to a first end of the housing at a first end of said body, the stream of resin flowable through the body aperture; and an insert removably attached to said body at a second end of said body, said insert and said body defining an opening therethrough, the cross sectional area of the opening in a direction normal to the direction of the stream of resin through the extruder being substantially smaller than the cross sectional area of the body aperture in a direction normal to the direction of the stream of resin through the extruder, the insert replaceable by merely removing the insert from the second end of the body, said insert including a first portion thereof positioned within the body aperture and a second portion thereof positioned outside the body aperture.

12. The die of claim 11:

wherein said body defines parallel spaced apart parallel body surfaces defining the body aperture therebetween; and wherein said first portion includes a first portion surface thereof, said first portion surface positioned adjacent one of said parallel body surfaces.

* * * * *